United States Patent [19]
Kim et al.

[11] Patent Number: 5,171,491
[45] Date of Patent: Dec. 15, 1992

[54] METHOD OF PRODUCING NEAR NET SHAPE FUSED CAST REFRACTORIES

[75] Inventors: Jonathan J. Kim, Williamsville; Thomas A. Myles, Jamestown; Bruce J. Dover, Lockport; Alan LeBold, Niagara Falls, all of N.Y.

[73] Assignee: The Carborundum Company, Niagara Falls, N.Y.

[21] Appl. No.: 652,756

[22] Filed: Feb. 8, 1991

Related U.S. Application Data

[60] Continuation-in-part of Ser. No. 276,496, Nov. 23, 1988, abandoned, which is a division of Ser. No. 826,636, Feb. 4, 1986, Pat. No. 4,791,077.

[51] Int. Cl.$^5$ .................. B29D 7/00; C04B 35/60
[52] U.S. Cl. .................. 264/25; 264/212; 264/332
[58] Field of Search .......... 264/80, 85, 121, 125, 264/22, 25, 212, 165, 299, 309, 332, 30; 427/34

[56] References Cited

U.S. PATENT DOCUMENTS

| | | | |
|---|---|---|---|
| 3,112,539 | 12/1963 | Barker | 22/200 |
| 3,257,196 | 6/1966 | Foex | 75/10 |
| 3,429,962 | 2/1969 | Krystyniak | 264/309 |
| 3,645,894 | 2/1972 | Krystyniak | 252/1 |
| 3,759,728 | 9/1973 | Miller et al. | 106/59 |
| 3,777,044 | 12/1973 | Nauty et al. | 13/33 |
| 3,896,244 | 7/1975 | Ellis et al. | 427/34 |
| 4,063,955 | 12/1977 | Fritsch, Jr. et al. | 106/39.6 |
| 4,119,472 | 10/1979 | Brashear et al. | 106/57 |
| 4,158,569 | 6/1979 | Brothers et al. | 106/66 |
| 4,219,344 | 8/1980 | Amistead et al. | 65/18 |
| 4,292,342 | 9/1981 | Sarma et al. | 427/34 |
| 4,294,795 | 10/1981 | Haga et al. | 264/332 |
| 4,297,388 | 10/1981 | Kumar et al. | 427/47 |
| 4,300,953 | 11/1981 | Lachman | 501/112 |
| 4,336,339 | 6/1982 | Okumiya et al. | 501/103 |
| 4,426,709 | 1/1984 | Fegerl et al. | 373/22 |
| 4,490,474 | 12/1984 | Statten | 501/115 |

FOREIGN PATENT DOCUMENTS 2104056 3/1983 United Kingdom .......... 35/

OTHER PUBLICATIONS

Kato, "Plasma Melting", *Taikabutsu Overseas*, vol. 4, No. 2, p. 23ff, 1984.
Spalding, B. J., "The Commercial Promise of Plasma Processing", Chemical Week, Sep. 11, 1985, pp. 36–41.
"Monofrax ® Refractory Systems for Glass Furnaces", Product Brochure, The Carborundum Company, Form A-2668 Eff. Oct. 1983.
Coes et al., "Advanced Materials Systems-Thermally Sprayed Coatings and Monolithic Refractory Shapes", SAE 700049 (1970).
Scott, "Plasma-Sprayed Ceramic Coatings," Proc. Brit. Ceramic Soc., No. 34 (1984), pp. 195–206.

*Primary Examiner*—James Lowe
*Assistant Examiner*—Christopher A. Fiorilla
*Attorney, Agent, or Firm*—Larry W. Evans; Joseph G. Curatolo; Scott A. McCollister

[57] ABSTRACT

A method of producing near net shape fusion cast refractories. The method includes the steps of continuously introducing refractory particles into a melting furnace, rapidly heating the particles, depositing the heated particles into a melt pool, continuously introducing the molten material into a mold, and continuously withdrawing a solidified body from the mold as the molten material continually solidifies. The above stated method produces a fusion cast refractory having a generally random, fine, uniform microstructure; uniform chemistry; and generally evenly distributed closed pores.

13 Claims, 5 Drawing Sheets

METHOD OF PRODUCING NEAR NET SHAPE FUSED CAST REFRACTORIES

This is a continuation-in-part of application Ser. No. 07/276,496, filed Nov. 23, 1988, now abandoned, which is a division of application Ser. No. 07/826,636, filed Feb. 4, 1986, now U.S. Pat. No. 4,791,077.

BACKGROUND OF THE INVENTION

The present invention relates to directly produced fused cast refractories which, as manufactured, are near in size and configuration to the desired final product as manufactured, and to a process for their manufacture which involves rapid melting and controlled, rapid cooling.

More particularly, the present invention is directed to a manufacturing process for near net shape fused cast refractories and to novel fused cast refractories which result from use of the present rapid melting, controlled rapid cooling process. The term "near net shape" as used herein means that the castings or moldings are near in size and configuration as cast or molded, and little or no material need be removed to prepare the moldings for use. The directly fusion cast refractories of the present invention are distinguished from those known in the art by a random microstructure throughout, as well as by other characteristics to be described herein. The term "random" as used herein in reference to microstructure means that the microstructure is non-directional in its crystal orientation.

Fused cast refractories have been known and used for many years. Such refractories have presented many advantages in certain uses over the older type of refractory products which comprise granular heat-resistant materials bonded in desired shapes with other heat-resistant ceramic materials. These older types of refractory moldings are also known as the "burned" and the "non-burned" types. These bonded refractories are produced by packing together refractory particles which have a large number of open pores between them. These particles are joined together by a bonding phase. When this refractory matrix is attacked by the action of an erosive or corrosive material, e.g., blast furnace slag, molten glass or the like, the fine particle portion of the matrix is predominantly eroded. Due to their interconnected porous nature, attack occurs beyond the exposed face of the refractory product.

A second classification of refractories is known as "fused cast" or "fusion cast" or "electrocast" refractories. These refractories have a very dense structure and hence high-strength and erosion resistance. They do not exhibit or contain interconnected pores.

A conventional fused cast refractory is manufactured by melting a mixture of the desired composition in an electric furnace similar to that used for the manufacture of fused alumina for use in abrasives. Such electric furnace includes a water-cooled iron or steel sheel without any lining other than that built up by the material being fused as it is fed into the furnace. Fusion is initially effected by heat from an electric arc between two or more electrodes inserted in the iron shell. After a bath of molten material is formed, the resistance of this material to passage of electric current through it is used to supply heat. The material to be melted is gradually introduced and the electrodes gradually raised as the fused mass accumulates. Apparatus of this type is shown and described in U.S. Pat. No. 929,517 to F. J. Tone.

Following fusion of the ingredients, the molten material is cast into a suitable mold by tapping or tilting the furnace so that the molten mass flows into the mold. The molten material is heated to a temperature considerably above its melting point prior to casting. The mold is commonly made of graphite, although it may be formed of other suitable materials. The mold is provided with a riser or header of ample size to enable complete filling of the mold without interference by material freezing in the headers. The cast piece is left in its respective mold for heat treatment, or removed from the mold after the outer walls of the casting have solidified and then annealed without other than its own support. Such annealing generally takes several days and may be accomplished by covering the cast parts with hot sand or other insulating material. The cast parts are generally packed closer together, thereby allowing them to anneal by virtue of their own heat. Such annealing is necessary to prevent excessive localized shrinkage upon cooling which gives rise to stresses sufficient to result in fracture. Annealing may also be accomplished by placing the piece in a furnace and gradually reducing the temperature. After the pieces have cooled, the cast parts are inspected and finished by diamond cutting and/or grinding. The header may be removed shortly after casting or after annealing. The amount of material in the header is often about equal to the amount of material in the desired finished refractory piece. Header material is commonly recycled, but at considerable expense. The casting and annealing process is described in U.S. Pat. No. 2,279,260.

In known processes for the manufacture of fused cast refractories, the molten material is well above its fusion temperature when cast and a long cooling period is involved before complete solidification occurs. As a result, conventional fused cast products have a directional crystalline structure which is fine grained adjacent the surfaces of the casting and increasingly coarse grained directionally toward the center or last portion to cool. The crystalline structure and chemical composition of the casting changes from surface to center according to the rate of cooling and the liquid-solid phase diagram for the composition that was cast, all of which determine the nature of and the rate of advance of the solidification front. Additionally, the chemical composition of conventional fused cast refractories is not uniform due to stratification in the furnace and mold caused by heavier material such as $ZrO_2$ and $Cr_2O_3$ settling toward the bottom due to gravity. Typical cooling rates used in the manufacture of conventional fused cast refractories are of the order from about 10° C. to about 50° C. per hour. Also, carbon is introduced into the melt by the graphite electrodes of the electric arc furnace. This carbon can cause carbon monoxide and silicon monoxide evolution, resulting in pores in the conventional fused cast product. Also, it is known that conventional fused cast refractories contain carbon in amounts up to ½ percent. Carbon is undesired when the refractory is used as lining of glass manufacturing tanks.

Many different compositions for fused cast refractories have been previously suggested and it has been found that for specific uses certain compositions are superior. Such fused cast refractories are, for example, suggested in U.S. Pat. Nos. 2,063,154; 2,279,260; 2,911,313; 3,188,219; 3,232,776; 3,759,728; 3,773,531; 4,158,569; 4,490,474, as well as others. Any of these compositions, as well as many others, may be used in conjunction with the present invention.

The use of plasma to heat or treat materials is widely known for certain applications, as exemplified by the following.

U.S. Pat. No. 3,257,196 discloses an apparatus and process for treating a powdery refractory material by directly contacting it with a stream of plasma.

U.S. Pat. Nos. 3,429,962 and 3,645,894 describe the preparation of metallic oxide layers and bodies consisting thereof by plasma spray deposition of substantially spherically shaped agglomerate particles of metal oxides onto a metallic mandrel which is thereafter etched away. The process of the present invention is distinguished because a molten layer is maintained which serves to assist capture of the particles being thrown. In conventional plasma spray coating as described in U.S. Pat. Nos. 3,429,962 and 3,645,894, a high percentage, e.g., 30 to 40 percent of the particles thrown, are not captured because the surface is totally solid and must be to avoid melting of the metal substrate. Also, according to the prior art plasma spray techniques, the resulting ceramic layer is of high porosity.

U.S. Pat. No. 3,777,044 discloses a plasma arc furnace for remelting of sheet waste material of high reactivity metals and their alloys. The waste material to be melted is presented in the form of a consumable electrode.

U.S. Pat. No. 4,119,472 is directed to fired refractory articles formed of rebonded, fusion cast alumina/zirconia/silica refractory grain.

U.S. Pat. No. 4,426,709 describes a transferred arc plasma heated furnace for the production of steel from solid and/or liquid charging materials.

Koshi Kato, in an article entitled "Plasma Melting", published in *Taikabutsu Overseas*, Vol. 4, No. 2, 1984, generally describes plasma melting and many of its various applications, and several types of plasma melting furnaces. Among these is described a plasma progressive casting furnace which utilizes one or more torches to melt raw materials in a water-cooled crucible, the bottom of which is lowered as the melting process proceed to cool the molten metal successively from the bottom. In his conclusion, this author indicates that higher melting point materials such as ceramic will be processed by these furnaces in the future.

SUMMARY OF THE INVENTION

In accordance with the present invention, it has been discovered that refractory fusion cast moldings can be directly produced by rapidly heating refractory particles by exposing them to a plasma, collecting the heated refractory particles in a melt pool, and thereafter shaping the flowing molten mass in a mold in a controlled manner to form a fully solidified casting having a random microstructure throughout. Thus, by continuously feeding additional refractory particles to the melt pool and continuously removing the shaped casting, a net shaped product can be produced in a continuous manner. A random microstructure as used herein means that crystal growth orientation is non-directional when a cross-sectional view including the center or last solidified portion of the casting is compared to that of a conventional fused cast refractory which has a generally radially oriented crystal growth pattern from surface to center or last solidified portion of the refractory. The refractory fusion cast moldings of the present invention are further characterized by a generally fine microstructure throughout, the absence of a header, and closed pores distributed throughout. These characteristics may be uniform throughout the cast product or varied in accordance with the desires of the designer or manufacturer. In contrast, in conventional fused cast refractories, the microstructure is fine adjacent to the mold due to rapid cooling at and adjacent to the mold surfaces, but becomes very coarse away from the edges as the center or last portion to solidify of the casting is reached. The present invention is not limited to any particular chemistry. It expands the range of compositions which may be fused cast. It enables production of fused castings which are entirely free of carbon. It is believed that compositions which are not electrically conductive when molten may be processed.

Figure 1:
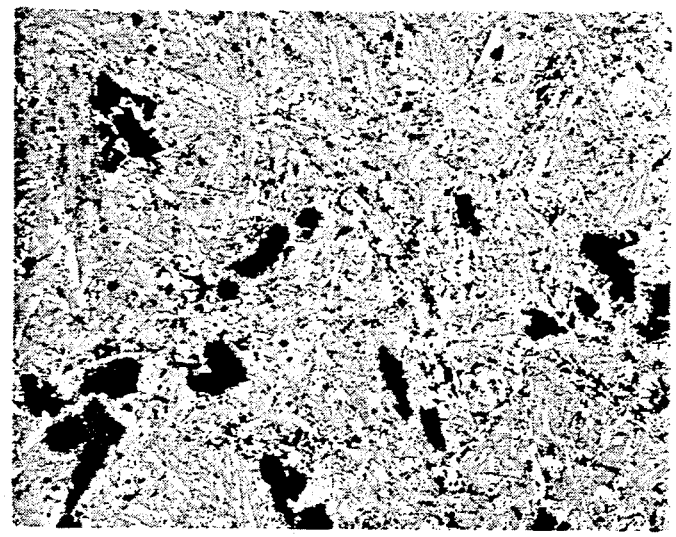
FIGS. 1 and 2 show at a magnification of 50 times the microstructure of a refractory casting according to the present invention, FIG. 1 being representative of the microstructure about ¾ inch from the wall of the mold and FIG. 2 being representative of the coarsest or worst case microstructure about 3 inches from the mold wall.
Figure 2:
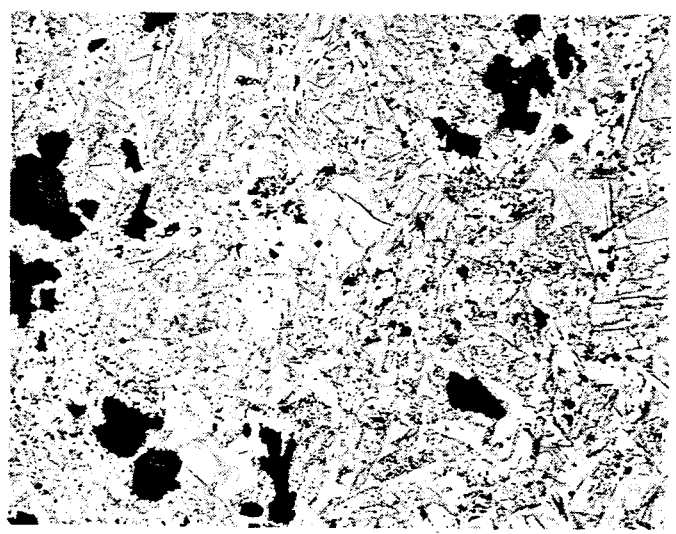
Figure 3:
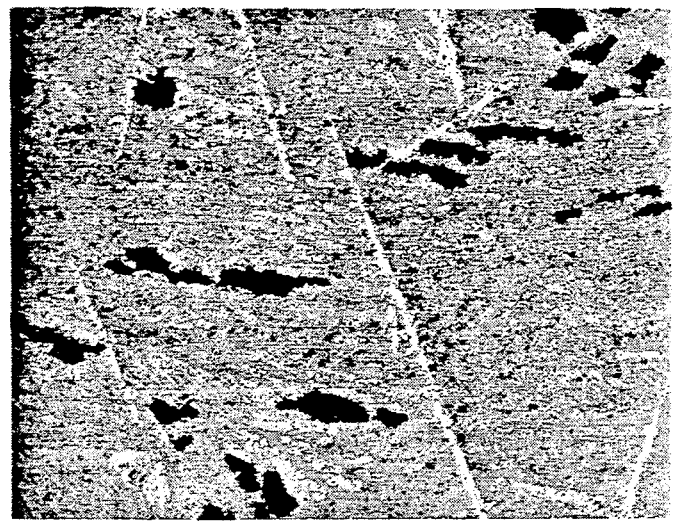
FIGS. 3, 4 and 5 representatively show at a magnification of 50 times the microstructure of fused cast refractories according to the prior art at distances of approximately ½ inch, 1½ inches and 2½ inches from the mold surface.
Figure 4:
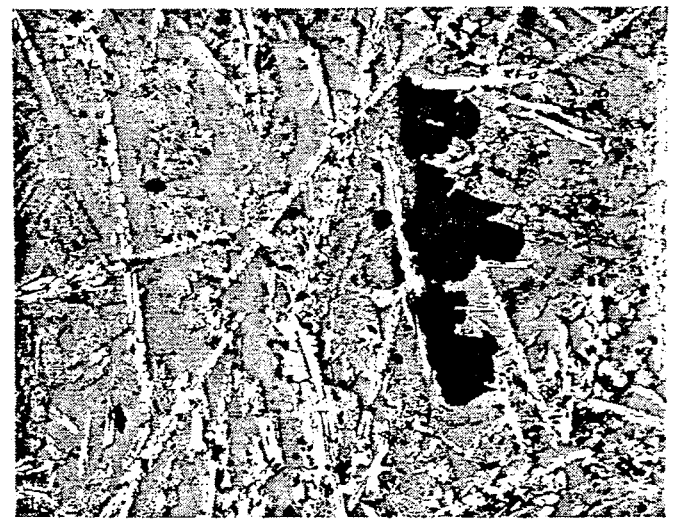
Figure 5:
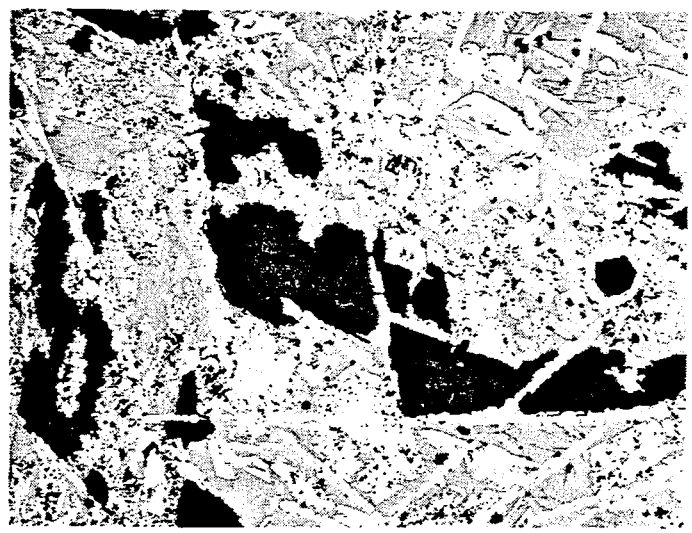

It is to be understood that FIGS. 1 through 5 are representative of fused cast refractory castings produced from 50 percent alumina/34 percent zirconia/14 percent silica, with the remainder being alkali and alkaline oxides. Alumina/zirconia/silica will be referred to hereinafter as AZS. In this specification and the appended claims, all percentages, ratios and fractions unless otherwise specified are given on a weight basis. The conventional fused cast product represented in FIGS. 3-5 is commercially available from The Carborundum Company, Niagara Falls, NY and is known as Monofrax ® S-3. The refractory molding depicted in FIGS. 1 and 2 was formed from the same bulk composition. The white area in each microstructure is dendritic zirconia. The lighter gray area is corundum with co-precipitated zirconia. The darker gray areas are high silica glass. The black areas represent voids.

DETAILED DESCRIPTION OF THE INVENTION

Referring to FIGS. 1 and 2, there is shown the microstructure of directly produced refractory castings according to the present invention. These castings are characterized by a generally random microstructure throughout in contrast to the highly directional microstructure which is present in conventional fused cast refractories of like composition such as those depicted in FIGS. 3-5. As shown in FIGS. 1 and 2, the refractory castings according to the present invention are also characterized by a generally fine microstructure throughout and by closed pores which are distributed throughout. These characteristics are generally uniform throughout the entire directly fusion cast body, when viewed as a whole, although they may be intentionally altered by varying the processing parameters during casting.

In contrast, in prior art fusion cast refractories the microstructure is very fine grained adjacent the mold surfaces due to very rapid cooling, but coarsens rapidly with distance from the surface of the casting. The microstructure depicted in FIG. 3 extends less than about 1 inch from the surface of the mold. As shown in FIG. 4, at a distance of 1¼ inches from the surface of the casting, the microstructure is greatly coarsened when compared to that adjacent the mold or casting surface, as shown in FIG. 3. At a distance of 2½ inches from the surface of the casting, as shown in FIG. 5, the microstructure is further coarsened.

A further distinction between fused cast refractory castings according to the present invention and those of the prior art is in uniformity of composition throughout the molding. In moldings according to the present invention the composition is generally uniform throughout, unless intentionally varied, whereas in castings according to the prior art the composition necessarily varies as gradual cooling and crystallization occurs and due to stratification as described hereinabove. As the temperature is gradually lowered during the slow cooling which exists in conventional fused cast refractories, the higher melting point component crystallizes first, thus shifting the chemistry of the remaining liquid. In contrast, in castings according to the present invention there is insufficient time for such shifts in chemistry to occur, or for statification of the liquidus due to gravity.

Another distinction between fused cast refractory castings according to the present invention and those of prior art is the purity of castings according to the present invention which are entirely free of carbon in their interiors. Slight carbon contamination may be present at or adjacent the surfaces which contact a graphite mold.

The mechanism in conventional fused cast refractories may be visualized as an advancing solidification front which sweeps the lowest melting point phase from the surface of the casting to the center or last portion to cool. The solidification rate is rapid at the surfaces of the casting but slows markedly as the solidification front advances inward. Because the surfaces of the casting are first solidified and thereafter the interior solidifies and shrinks in conventional castings, there results a large void at the last part of the casting to cool. This void is known to those skilled in the art as a "vug". Castings according to the present invention may also contain a vug, but its size is greatly reduced.

For the particular AZS system shown in FIGS. 1-5, one can observe that the amount of voids and the amount of silica glass in FIG. 5 is considerably greater and differently distributed than in FIGS. 1 and 2 which are representative of this same feedstream chemistry utilizing the present invention.

Fusion cast refractory castings according to the present invention have a fine, non-directional microstructure when compared to their conventional fused cast counterparts. For the specific AZS system depicted in FIGS. 1 and 2, there is an absence of coarse, dendritic zirconia in contrast to the microstructure of the conventional fused cast product of the same composition which contains laths of corundum mottled with zirconia in siliceous glass. For the AZS system depicted in FIGS. 1 and 2 according to the present invention, the refractory castings have fine, non-directional precipitates of zirconia with corundum. This is due to the small amount of liquid present at any given time due to the rapid melting by the very intense heat from the transferred arc DC plasma and concurrent rapid cooling to the mold. The glassy phase of the product according to the present invention is random in contrast to the laths of corundum mottled with zirconia which are present in the conventional fused cast product. The fused AZS casting, according to the present invention has a pearlitic structure. The fused casting according to the present invention contains closed pores distributed generally evenly throughout rather than being concentrated as gas bubbles rise toward the header in conventional fused cast refractories. The size of these pores can be controlled; they can be almost eliminated by close control of the process. Some pores will naturally occur due to the amount of shrinkage inherent in the composition being cast. In contrast, in conventional fused cast refractories of the same bulk composition, there are many aggregated pores at the center or last region to solidify. The distribution of the pores cannot be controlled other than to attempt to counter this effect by use of a large header at great expense. No header is necessary in fused castings according to the present invention. In contrast, a large header, often equal in mass to the part being cast, is necessary to offset the shrinkage inherent in the conventional fused cast process.

Large area thin sections, e.g., tiles of 1 inch × 12 inches × 12 inches, can be produced directly according to the present invention. In contrast, when the conventional fused cast process is employed, it is necessary to make a large block which is thereafter sliced into tiles because rapid heat withdrawal by the mold prevents reliable complete filling. These conventional tiles vary in microstructure according to where they are taken from the large block, or vary from edge to center as inherent in the large cast block.

It is understood that the particular microstructures given in FIGS. 1-5 are indicative of the results obtained when the specific AZS chemistry is being utilized. Different microstructures are expected when different chemicals systems are cast, but the general observations as to the differences in directionality and uniformity between those produced according to the present invention and those produced according to prior art methods will always be present.

APPARATUS

Figure 6:
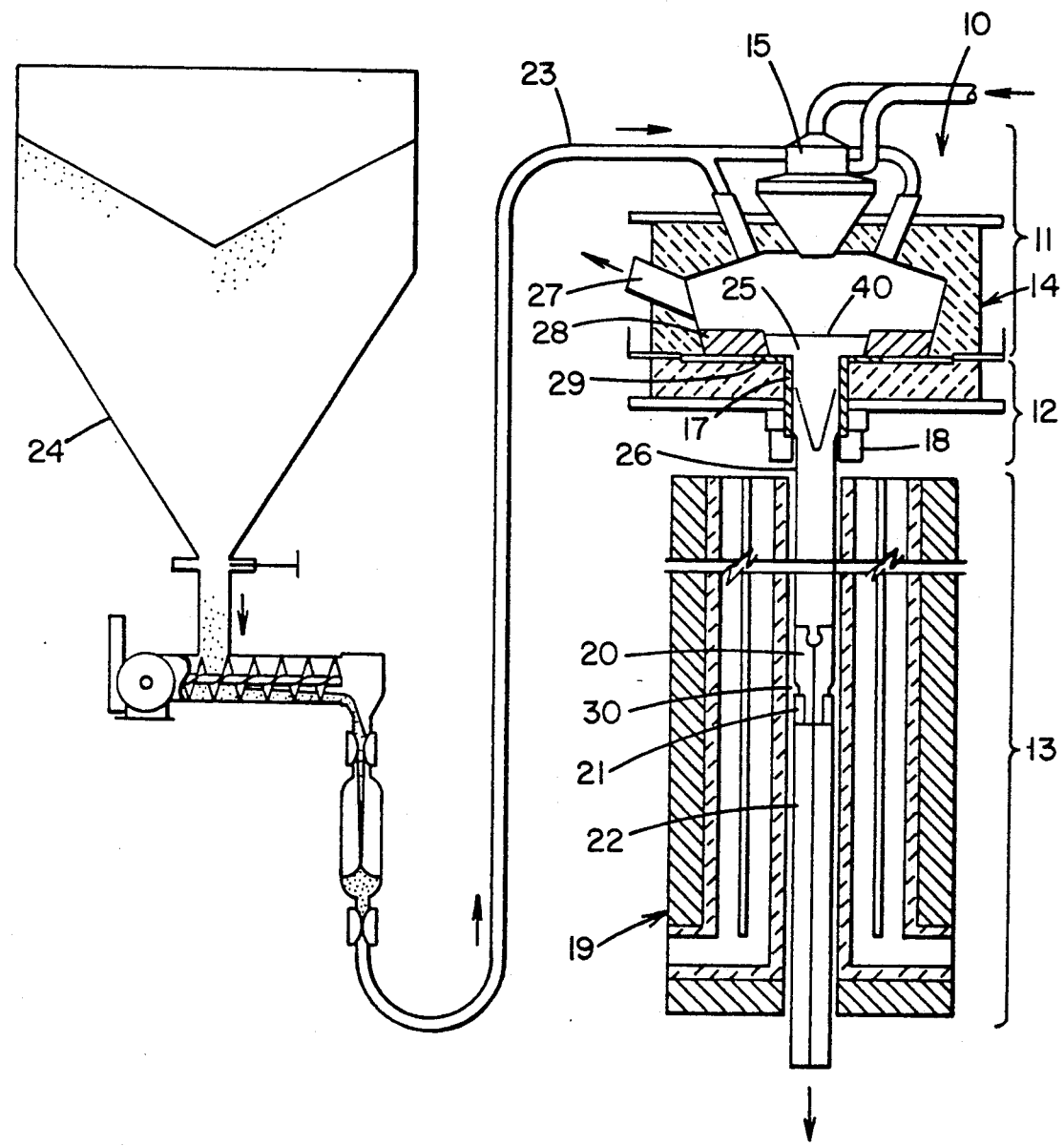
FIG. 6 is a schematic elevation view, partly in section, showing a preferred apparatus and process embodiment according to the present invention for the manufacture of directly fused cast refractory bodies of the present invention.
Figure 7:
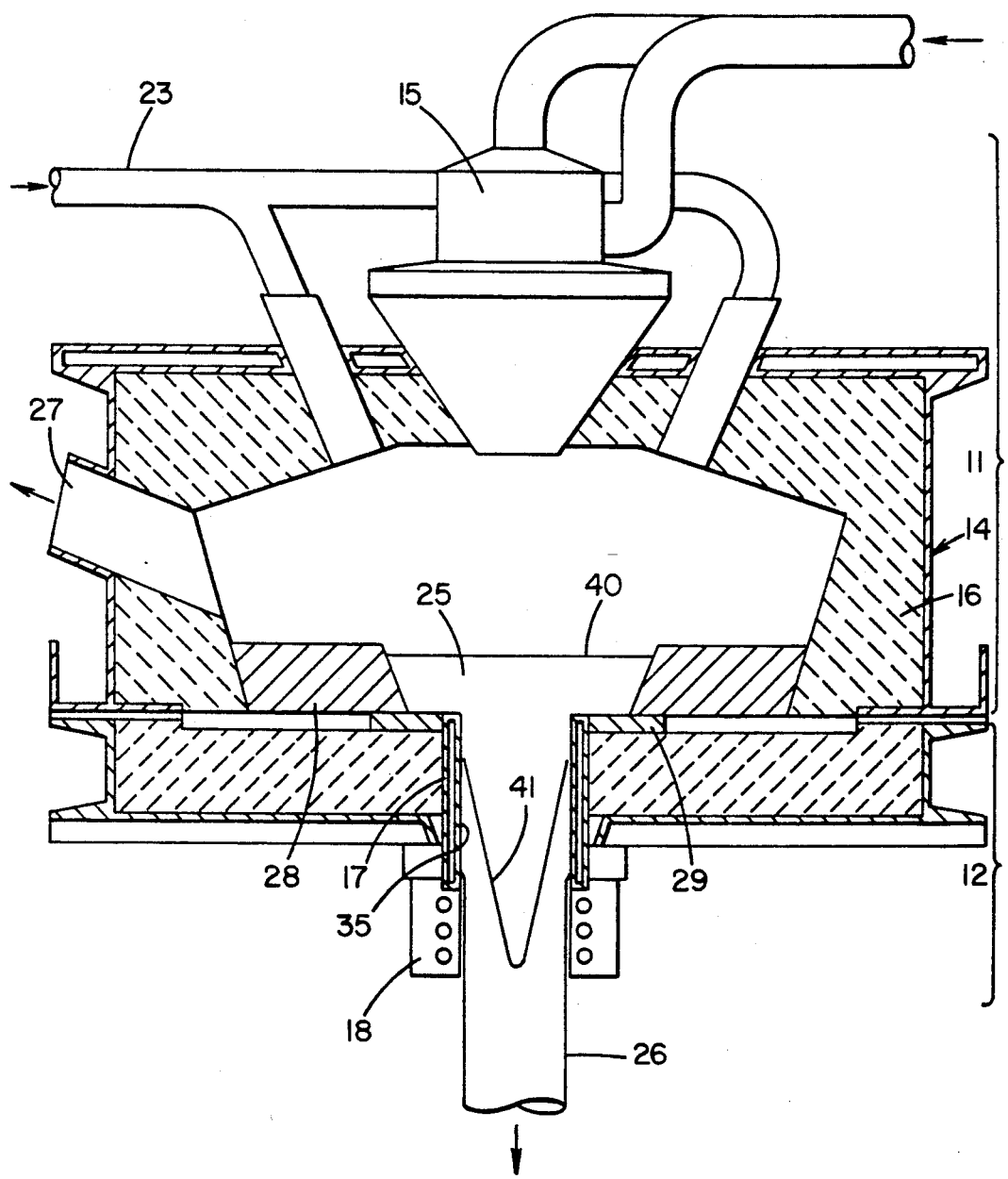
FIG. 7 is a detailed drawing of the melter apparatus according to the present invention.

In FIGS. 6 and 7, there is illustrated schematically a casting apparatus 10 for use in the present invention. The apparatus consists of four major subsystems: the melter 11, the casting system 12, the annealing system 13, and the casting motive system 30.

The melter 11, shown in detail in FIG. 7, comprises a furnace 14, a means of heating the refractory particles 15, and an electrical power supply (not illustrated). The furnace 14 is constructed of water cooled steel or stainless steel and may have a refractory lining 16. The means of heating the refractory particles 15 could comprise graphite electrodes operated as an open arc, submerged electrodes, or at least one plasma torch. The preferred means of heating comprises at least one plasma torch. The torch itself may be of conventional design and does not constitute a part of the present invention. It is highly preferred that the torch be of a configuration intended for generation of transferred arc DC plasma, although it is believed that other types of plasma, such as RF plasma and DC non-transferred arc plasma, are also operable. DC transferred arc plasma is highly preferred due to its extremely high energy concentration and the high capture efficiency of the charged refractory particles which are projected into the melt pool.

The casting system, shown in detail in FIG. 7, comprises a mold 17, a water-cooled jacket 18, means for sealing to the melter 28 which is preferably composed of graphite, a graphite retaining ring 29 to hold the mold walls in place, and a water-cooled metal shell (not shown) to contain the refractory. The mold is totally submerged below the refractory liquid level (line 40). The mold walls are made of graphite, glassy carbon, boron nitride, boron nitride-zirconium diboride, silicon carbide, or other chemically and thermally resistant material. The thickness and height of the mold walls are related to the casting cross-section and to the casting and mold material properties, i.e., thermodynamic, transport, mechanical, and electrical properties. The water-cooled jacket, located below the mold walls, provides secondary cooling of the casting through radiative and convective heat transfer.

The annealing system 13 comprises one or more furnaces 19 which can be electrically heated with either metal, metal silicide, or silicon carbide elements, a plasma torch, or gas fired, either directly or indirectly. Shown in FIG. 6 is a gas fired furnace which indirectly heats the casting by radiant heat from the walls of the furnace. The annealing system is used where appropriate because of the thermal shock properties of the fused cast ceramic products. However, it is not always necessary to add heat to the annealing system as there are ceramics which do not require any more heat than that which the casting itself possesses and so heat loss can be controlled in a passive fashion.

The casting motive system comprises a mold bottom 20 which is mechanically attached to an elevator arm 21 which extends up into the annealing furnace to draw the casting down through the annealing furnace, and an elevator system 22 capable of controlled speed in either direction.

MANUFACTURING PROCESS

Refractory powder 23 is introduced into the melting furnace 14 from the powder source 24. The melting furnace 14 is operated at a temperature sufficiently above the melting point or range of the ceramic to melt the refractory powder at the rate at which it is introduced into the furnace. Except for a short period during start-up, the feed is captured by a pool of molten ceramic 25. Several different methods of start-up or restart of the casting process are envisoned for the present method. The first method is a hot start, wherein a plate of suitable material, such as graphite, is inserted onto the melt furnace above the mold assembly trapping a quantity of refractory melt in the melt furnace. The melt furnace is then separated from the mold assembly and a new mold assembly is inserted. Alternatively, the casting is removed from the mold assembly and the mold assembly is cleaned and reinserted into the casting apparatus. The graphite plate is then removed allowing refractory melt to flow into the mold.

Another start-up method is a warm start, wherein a casting run is terminated by discontinuing the powder feed, draining the melt pool into the mold and withdrawing the casting from the mold. The torch is left on to maintain the melt furnace at or near the operating temperature. The melt furnace is then separated from the mold assembly so that the mold assembly can be cleaned and replaced or so that a new mold assembly can be inserted. Once the mold assembly is in place, the powder feed is started and a melt pool is established as soon as possible. This is the preferred method of start-up.

A third start-up method is a preheated start, wherein the melt furnace is preheated by the torch to almost operating temperature and then joined to the mold assembly. The powder feed is started and a melt pool is established. Casting can begin before the operating melt pool depth is achieved. The casting withdrawal rate is set at steady state operating level once the operating melt pool depth is achieved.

An alternative start-up method is a cold start which is substantially similar to the preheated start-up method except that the melt furnace is at room temperature when it is joined to the mold assembly. Steady state operation takes longer to establish with this method than with the previous methods because more heat is required to fully heat the refractory lining of the melt furnace.

After steady state operation is established, the melt pool temperature is very uniform due to the insulating effect of the refractory lining of the melt furnace and to the stirring action induced by the plasma torch plume. The average retention time (ART) of the refractory melt, defined as the melt pool mass divided by the feed rate, should range between 0.05 hour and 0.5 hour. An ART less than 0.05 hour results in a product casting having nonuniform chemistry, dispersion and degassing. An ART greater than 0.5 hour may lead to decomposition and/or volatilization of some components of the ceramic.

The mold wall 17, which is completely submerged in the liquid melt pool, is indirectly cooled from below by the water cooled jacket 18. The upper portion of the mold wall is in contact with the molten ceramic and therefore is at or above the melting point of the ceramic. Because heat transfer from the casting is only through the surfaces of the casting, the solidification front (line 41) must move from the surface toward to the center of the casting. With the submerged, indirectly cooled mold walls of the present invention, the initial, or surface layer rate of solidification is much slower and better matched to the bulk, or average rate of solidification than when the mold walls are directly cooled. As a result, the solidification front is more "V" shaped. Because of this more uniform rate of solidification, the resulting refractory casting has a more uniform microstructure and the "witness marks", or striations formed as the casting is moved in an oscillatory or stepwise manner, are much less penetrating. Therefore, less finishing of the casting is required. Precise solidification time depends on the size and thickness of the casting.

The refractory casting 26 exits the water-cooled jacket 18 and then either passes into an annealing chamber 13 or is allowed to cool in air. Annealing is defined here as controlled cooling, or reheating followed by controlled cooling. The annealing chamber can be actively heated, or can be passively heated wherein the chamber is insulated and the source of heat is the casting itself.

The manufacturing process is described as a continuous casting process because refractory particles can be continuously fed into the melt furnace and there is no limit on the length of the annealing system. Alternatively, an apparatus for cutting the casting as it exits the annealing furnace may be added to the casting process. Once the casting has sufficiently cooled, it can be cut to the desired length and the casting process can continue uninterrupted.

As previously stated, it is highly preferred to use a DC transferred arc plasma. The gas to be converted into a plasma may be any gas; however, for the commercial manufacture of known refractory compositions this gas will usually be a non-oxygen-containing gas such as nitrogen or oxygen-containing air, the choice being dependent on the composition of the particular refractory desired to be made.

Gas evolution from the melt pool is desired to prevent formation of porosity beyond that which is induced solely by thermal shrinkage. Evolution of gases through exhaust port 27, e.g., SiO, $Na_2O$ and CO is easily accomplished during manufacture of fusion castings according to the present invention because the only liquid present is at or near the upper surface of the casting. Additionally, less quantity of gas is generated because no carbon is introduced when nitrogen or other carbon-free gas is converted electrically to plasma in a metal torch. In contrast, in standard fusion cast refractories, gas evolution is difficult due to the large volume of liquid and the header. The mold must be configured and positioned such that gases can rise through the cast part into the header and, at best, is only partly effective unless a great amount of waste is accepted with attendant premium cost. Also, in the conventional fusion cast process, graphite electrodes are employed to melt the refractory material. During the melting, carbon from these electrodes is introduced into the melt, some of which is converted to carbon monoxide and silica $SiO_2$ is converted to silicon monoxide gas.

Additionally, the process of the present invention is considerably more energy efficient than conventional fused cast processes. This is largely due to the lack of a header when the process of the invention is practiced.

The process of the present invention may be utilized to produce composite, directly joined, fused cast refractories heretofore impossible or impractical. A second refractory composition may be projected directly upon a first refractory composition previously cast. Refractory particles of a first composition may be deposited in a mold for a time sufficient to form a casting that is at least partly solidified, and thereafter refractory particles of a second composition may be deposited onto said casting to form a composite layered casting in which the first fused cast refractory material is directly joined to the second fused cast refractory material. A gradient or transition zone in composition is expected in such laminated composite castings.

The following examples, including Table 1, illustrate the invention.

EXAMPLE 1

Pure zircon sand ($ZrO_2:SiO_2$) which has been analyzed to be 99+% pure is blended with 99.5 percent pure alumina ($Al_2O_3$) to form a dry particulate mixture having the following proportions: 50 alumina/34 zirconia/14 silica. To this AZS powder is added about 1 wt. % sodium carbonate ($Na_2CO_3$) and about 20 wt. % scrap AZS material to make up the feed material. The scrap AZS is recycled AZS, most probably crushed cast material from the header produced by a conventional casting method. This scrap AZS has the same level of purity as the particulate AZS to which it is added. The feed material is crushed to $-5$ mesh and then conveyed to the refractory lined melting furnace using a pulsed pneumatic conveyor. The feed stream is split into two relatively equal streams approximately 2 feet from the melter. The streams enter the melter on either side of a DC plasma torch which is located in the center of the top cover of the melter. The torch is essentially vertical, but inclined 4° away from the exhaust. The start-up method used is the cold start method. The feed streams are oriented so as to contact the melt pool surface near the point where the torch plume contacts the melt pool surface.

The melt pool temperature is between 1750° and 2000° C., as measured by a commercially available pyrometer. The approximate internal dimensions of the melter are 18 inches in length $\times$ 18 inches in width $\times$ 7 inches in height. After a 2-inch deep melt pool has been established, a 3 inch $\times$ 12 inch casting is pulled from below by lowering the mold bottom. The mold from which the casting is pulled is constructed of graphite plates.

The torch is operated in transferred arc mode at approximately 165 kW and 7000 Btu/lb nitrogen flow. The casting is produced at a rate of 180 lb/hr during the steady state portion of the run which lasted about 1 hour. The casting is then placed in a preheated electric furnace at 1200° C. and allowed to cool at a controlled rate to about 100° C. The casting produced is about 40 inches in length.

Example 2

Substantially in accordance with the procedure of Example 1, except that the torch power is reduced to 140 kW while the nitrogen flow is reduced to 6500–7000 Btu/lb. The feed rate is lowered to 130 lb/hr and the resulting cast length is 34 inches. The electrically heated furnace of Example 1 is replaced with an in-line, indirect gas fired furnace into which the casting moves as it is formed.

The procedure of both Example 1 and Example 2 resulted in a casting having a uniform random microstructure, high density and a small vug, and further, absent of any cracks.

TABLE 1

| Specific Example(s) | unit | (1) | (2) |
| --- | --- | --- | --- |
| Feed Material | | AZS 20% Scrap | AZS 20% Scrap |
| Feed Method | | Pulse Pnuematic Near Base of Plume | Pulse Pnuematic Near Base of Plume |
| Feed Rate | lb/hr | 180 | 130 |
| # Feed Ports | | 2 | 2 |
| # Torches | | 1 | 1 |
| Melt Pool Area | ft² | 0.7 | 0.5 |
| Melt Pool Depth (to top of mold) | in. | 2 | 2 |
| Temp. of Melt Pool | °C. | 1750–2000° C. | 1750–2000° C. |
| Melter Lined (Insulated) | | Yes | Yes |
| Torch Power | kW | 165 | 140 |
| Mold Dimensions | in (nominal) | 3 × 12 | 3 × 12 |
| Side Wall | in (nominal) | 9/16 × 5¼ | 9/16 × 5¼ |
| End Wall | in (nominal) | ¼ × 5/14 | ¼ × 5¼ |
| Mold Material | | Graphite | Graphite |
| Ground Strap | | 1" × 1" cu bar | 1 × 1 cu bar |
| Cooling Jacket Material | | Cold Rolled Steel | Cold Rolled Steel |
| Height | in. | 3 | 3 |
| Contact Area | in² | 25 | 25 |
| Annealing (Active/Passive) | | Active | Active |
| Method of Heating | | Electric | Indirect Gas |

TABLE 1-continued

| Specific Example(s) | unit | (1) | (2) |
|---|---|---|---|
| Annealing Furnace | | Resistance | Fired |
| Init. Temp. | °C. | 1200 | 1200 |
| Ramp | −°C./hr. | 25 | 25 |

The foregoing description and embodiments are intended to illustrate the invention without limiting it thereby. It will be understood that various modifications can be made in the invention which are obvious from the embodiments which have been described in detail. These variations are intended to be included within the present specification and claims. Examples of such variations are the following. Multiple plasma torches could be employed. The refractory powder material could be passed longitudinally through the torch or introduced at a different point along the length of the torch or introduced into the plasma following its exit from the torch. The refractory powder could be introduced via belt or screw type or vibratory conveyers rather than through gas transport.

What we claim is:

1. A method of continuously casting a near net shape body of a refractory material comprising:

continuously introducing refractory particles from a refractory particles source into a melting furnace;

rapidly heating said particles of refractory material;

depositing said heated refractory particles into a melt pool to form a fused mass;

retaining said fused mass in said melt pool for a time sufficient to permit uniform dispersion and evolution of gases from the refractory material;

continuously introducing said fused mass into a mold, said mold having a portion thereof at or above the melting point of said refractory material;

and continually withdrawing said fused mass from said mold such that said fused mass is controllably cooled as it is withdrawn from the mold portion which is at or above the melting point of the refractory material whereby a solidified near net shape fusion cast refractory having throughout a generally random, fine, uniform microstructure; uniform chemistry; and generally evenly distributed closed pores is continually cast.

2. The method of claim 1 wherein said refractory particles are heated with a plasma torch.

3. The method of claim 2 including heating said fused mass with the plasma produced from said torch.

4. The method of claim 2 wherein the plasma of said torch is produced by transferred D.C. arc.

5. The method of claim 2 wherein said rapid heating is accomplished by introducing said particles into the plasma of said torch in concurrent flow.

6. The method of claim 2 wherein the plasma of said torch is selected from the group consisting of nitrogen, air and mixtures thereof.

7. The method of claim 1 wherein the fully solidified molding is further rapidly cooled.

8. The method of claim 1 wherein the refractory particles are minus 5 mesh U.S. standard screen.

9. The method of claim 1 wherein the refractory particles are heated to a temperature and for a time sufficient to permit evolution of gases to produce a solidified casting of low porosity and the fused mass is cooled rapidly enough to prevent stratification.

10. The method of claim 1 wherein said refractory particles comprise a first composition and a second composition and said first composition is deposited into said mold for a time sufficient to form a casting that is at least partly solidified, and said second composition is subsequently deposited onto said casting to form a composite layered casting.

11. The method of claim 1 wherein said refractory particles are of differing compositions.

12. The method of claim 1 further comprising cooling said solid body in a controlled manner as it is withdrawn from said mold.

13. The method of claim 1 including selecting a mixture of alumina, zirconia and silica particles as said particles.

* * * * *